(No Model.)  W. H. KELLOGG.  3 Sheets—Sheet 1.
WHEELED CULTIVATOR.

No. 550,622. Patented Dec. 3, 1895.

Witnesses:
Walter S. Wood
Dorr E. Wood

Inventor,
William H. Kellogg
By Fred L. Chappell
Att'y.

(No Model.)  3 Sheets—Sheet 2.

W. H. KELLOGG.
WHEELED CULTIVATOR.

No. 550,622. Patented Dec. 3, 1895.

Witnesses:
Walter S. Wood
Dorr E. Wood

Inventor,
William H. Kellogg
By Fred L. Chappell
Att'y.

(No Model.) 3 Sheets—Sheet 3.
W. H. KELLOGG.
WHEELED CULTIVATOR.
No. 550,622. Patented Dec. 3, 1895.
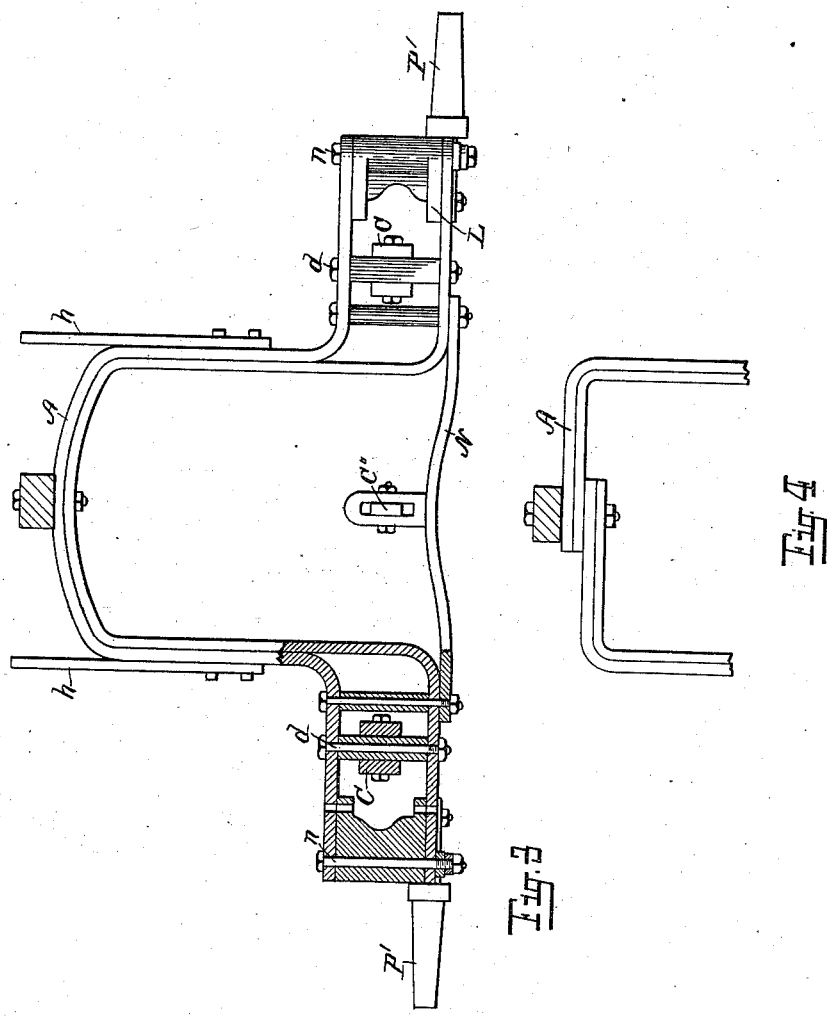
Witnesses:
Walter S. Wood
Dorr E. Wood
Inventor,
William H. Kellogg
By Fred L. Chappell
Att'y.

United States Patent Office.

WILLIAM H. KELLOGG, OF LAWTON, ASSIGNOR OF ONE-HALF TO WILLIAM A. FORBES AND THERON Y. SEBRING, OF KALAMAZOO, MICHIGAN.

WHEELED CULTIVATOR.

SPECIFICATION forming part of Letters Patent No. 550,622, dated December 3, 1895.

Application filed October 2, 1894. Serial No. 524,714. (No model.)

*To all whom it may concern:*

Be it known that I, WILLIAM H. KELLOGG, a citizen of the United States, residing at the village of Lawton, in the county of Van Buren and State of Michigan, have invented certain new and useful Improvements in Wheeled Cultivators, of which the following is a specification.

My invention relates to wheeled cultivators, and particularly to wheeled cultivators that are adapted to fruit culture and more particularly to grape-vine culture.

The objects of my invention are, first, to provide in a wheeled cultivator a practical cultivator tooth or plow that can be operated by the hand to pass in between the hills, trees, or vines to cultivate the ground between the same when the cultivator is passing between the rows; second, to provide in a wheeled cultivator improved means of properly steering and managing the cultivator independent of the draft of the horses, so that it can be thrown to or from the rows of vines absolutely by the person operating the same; third, to provide improved means of controlling the teeth of the cultivator to lift them up and down; fourth, to provide a cultivator, the width of which can be readily adjusted to cultivate between broad and narrow rows; fifth, to provide improved means of changing the cultivator from a fallow to a corn cultivator that shall be capable of straddling the row. I accomplish these objects of my invention by the mechanism shown in the accompanying drawings, in which—

Figure 1:
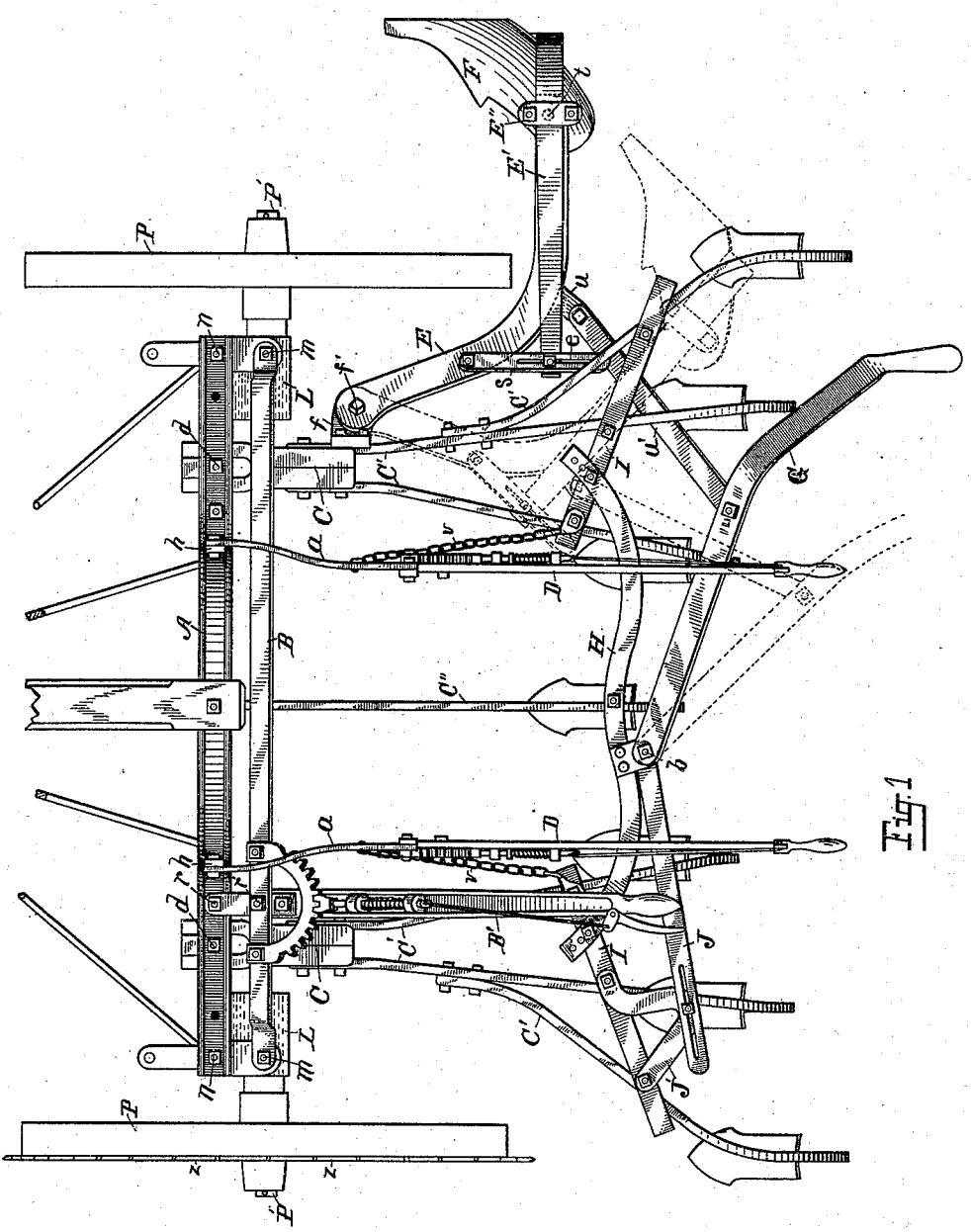
Figure 2:
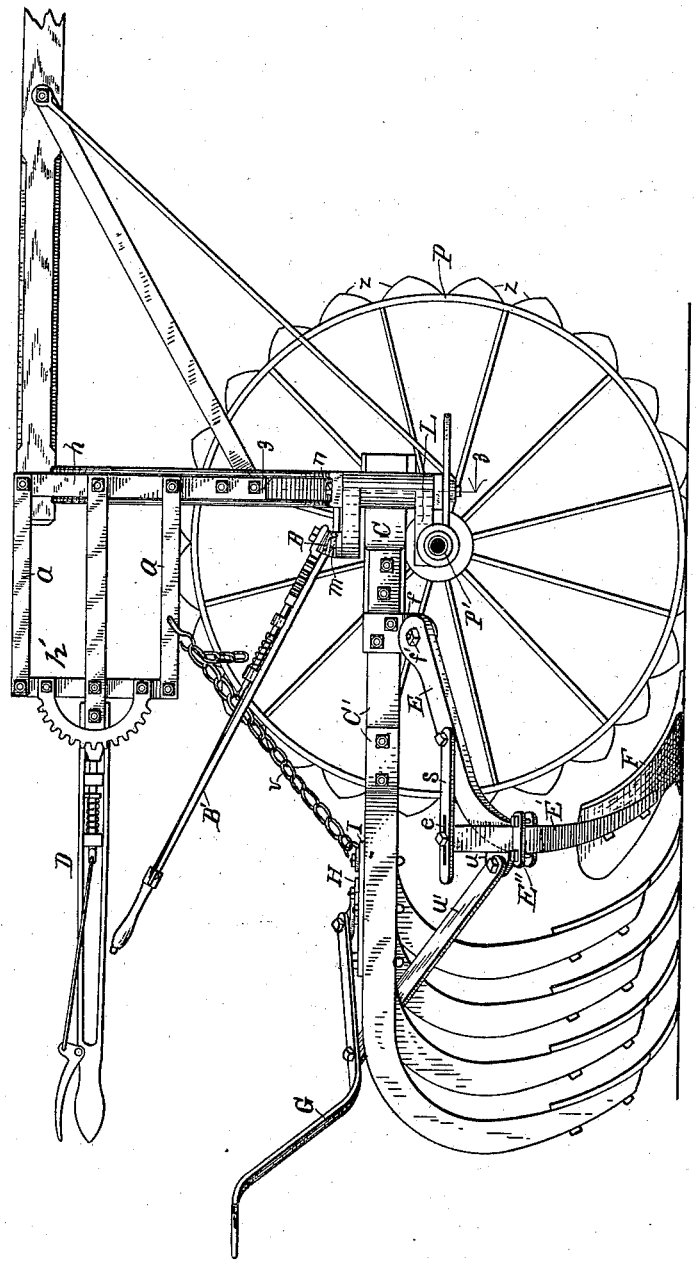

Figure 1 is a top plan view of my improved cultivator, the tongue and its connections being broken away. Fig. 2 is a side elevation of the same, looking from the right-hand side toward the left of Fig. 1. Fig. 3 is a detail view, partly in section, on line 3 3 of Fig. 2. Fig. 4 shows the construction of the arched beam A shown in Fig. 3 when the width of the machine is made adjustable.

Similar letters of reference refer to similar parts throughout the several views.

In the drawings the general framework is supported on two wheels P P. The framework consists of the channel-iron beams A, bent up into an arch over the central portion, one beam being placed above the other. At the ends of the beam the channel-irons are separated and parallel to each other exactly vertical one above the other. To the upper point of the arch the tongue is attached and is held in position by suitable braces running from the tongue to the frame. Across the lower or open part of the arch extends the bar N, which stiffens the frame and supports it when the cultivator is used for fallow use or in cultivating grape-vines or fruit-trees. On this bar N is a suitable bracket above, to which the bar C'' of the middle tooth is attached. To each end of the beams A are pivoted at $n$ iron brackets L by the bolt $n$ passing down through the same. On the plate extending to the rear of said bracket are situated the axles P', on which the wheels P revolve, all of which pivot at $n$, making it possible to turn the wheels at an angle to the direction of the machine.

On pivots $d$, toward the center of the machine from the pivots $n$, are supported blocks C, to which the rearwardly-extending beams C', bearing downwardly-curved standards having teeth attached, are attached. The arms C' are bolted to each side of these swinging blocks C and extend rearwardly and curve downwardly and bear the teeth of the machine. Across these arms to the rear is securely attached the metal bars I, which hold the teeth in a relative position to each other.

To the sides of the central arch are attached two vertical iron bars $h$. A lever D is pivoted to each bar and extends rearwardly in a substantially horizontal position. Bars $a$ $a$, parallel to each other and to the lever D, are pivoted to the bar $h$, and are pivotally united together and to the lever D by the vertical bar $h'$, which is parallel to the vertical bar $h$. On the vertical bar $h'$ is a notched segment with which a suitable catch engages operated by the use of a hand-grip on the lever. A chain V extends from one of the parallel bars or any convenient part of this mechanism down to the section of the teeth on that side. There is a lever and lever mechanism to each side of the machine to adjust the sections of teeth to each side independently. The lever-adjusting mechanism operates so that the bars $a$ $a$ and the bars $h$ $h'$ move in substantially the same manner as parallel rulers, and they are locked in their position by means of the catch in the notched segment, which supports them up or down or in any position to which they may be adjusted. The position of the levers is indicated by dotted lines in Fig. 2.

Across the front of the machine, just above the axles P' and parallel with the arch-beam A, extends a bar B, which is pivoted at $m$ $m$, just above the inner end of each of the axles P'. A lever B' is pivoted at $r$ on the arch-beam A, and is pivoted on the bar B at $r'$, and a suitable catch acts in a segment carried on the bar B. This lever, the pivot in the bar and on the frame being the same distance apart as the pivots $n$ and $m$, will, when it is operated, tend to turn the wheels P, so that they will run in a varying direction to the line of the machine and will consequently, when this lever is operated, steer the machine from one side to the other, as desired by the operative, depending on which way he moves the lever B'. One of the wheels P is provided with comparatively thin sharp-pointed teeth $z$ $z$, which penetrate the ground and insure the proper guiding of the machine, no matter how hard the ground may be. The guiding of the machine is very essential in cultivating vines on a sidehill or in terraces, as it enables the operative to adjust the machine to travel in the right position with regard to the rows.

To the right side of the machine in this case is located a plow F, which is controlled by the handle G, so that the person operating the cultivator may control the plow F, so that in passing a row of vines he may hold the machine out and forward, and when it comes to a hill in the row, or a vine, or a tree, as the case may be, he can pull the lever back, which will withdraw the plow out, and then push it forward again, and when the cultivator comes to the next hill he can repeat this operation, thus cultivating the ground in the row between the hills, vines, or trees, as the case may be. This plow is carried by an arm E, which is pivoted at $f'$ to a small lug $f$, which is bolted to the bracket C. A small arm E' is attached directly to the plow F and passes up and is connected by a clip E'' to the end of the bar E. A link $s$, having a slot $e$ therein, is pivoted at its forward end to the bar E. A bolt in the end of the arm E' slips through the slot E in the bar $s$, and enables an adjustment of the plow F by a movement of this end of the arm back and forth, it turning in the clip E'' freely. A small pivot $t$ (indicated by dotted lines in Fig. 1) can be placed in the clip E'' to insure a proper pivoting at that point.

Across the entire rear of the machine and connecting all of the teeth together extends a bar H. Pivoted to this bar H at $b$ is a curved lever G, which projects over well toward the right-hand side of the machine. On a lug $u$ of the arm E is pivoted a link $u'$, which passes back and to the left and is pivoted to the lever G. In operation, when the plow F is properly adjusted, the operative takes the lever G in his hand, drives along the row, and when he comes to a vine, hill, or tree, as the case may be, releases his grip on the lever, when the plow of its own force will be carried around to the position indicated by dotted lines and the lever will swing back also to the position indicated by dotted lines. As soon as the tree, vine, or hill, as the case may be, is passed, the operative then again applies force to the lever G, forces it out into the soil until the next vine, hill, or tree is reached, when he allows the plow to again return to the position indicated by dotted lines. When the soil is very loose and mellow, it may be necessary for him to pull the lever back, but ordinarily as soon as he releases the lever the plow F will swing back to position out of the way, owing to the resistance of the soil. An ordinary cultivator-tooth may be used in place of the plow F and be operated in this same way. It will be noted that the connection I have here made gives the operative great advantage by presenting a kind of toggle-joint between the pivot $u$ and the pivot $b$, making it very easy for the operative to hold the plow in place, yet allowing it to return as soon as the force is released. While the operator is at work with this machine, by taking hold of the lever B', if the machine does not run near enough to a row, he can turn the lever in the right direction to steer it up to position by turning the wheels in that direction. This gives the operative complete control of the machine in every particular, whether the team is traveling exactly right or not.

When the ground is hard or weeds are very thick, or there is much grass growing between the vines or plants to be cultivated, it is necessary to make the frame very rigid. This I accomplish by connecting the curved piece J' rigidly to one of the braces I and connecting the adjustable braces J from the pivot $b$ over that point, clamping the two together by a bolt. This forms a triangular brace, which holds the machine firmly and permits of adjustment of the teeth well over to the side toward the plow to enable it to pass well out between the rows where that is necessary.

When it is desired to use my improved machine to cultivate between narrow rows, the construction in Fig. 4 shows the method of adjustment. The channel-irons A are moved together, which brings the wheels nearer together, and a shorter piece N is substituted at the bottom to brace the same thoroughly.

I desire to say that the teeth $z$, on the periphery of the wheels P, would not be necessary in all soils or under all conditions, and the machine will operate very well without them, though it is a great advantage to have them there, especially in sidehill cultivation, because they enable the machine to be operated close to the row when it is passing on the downhill side of the row, and it enables the machine to be held away from the row at the proper position when passing on the uphill side of the row, thus making it a very desirable implement for the purpose. When this improved cultivator is to be used for cultivating corn or other crops on which it is desirable to have the machine straddle the row, the bar N, with its tooth, is removed and any suitable guards and handles are attached, as in ordinary cultivators for the purpose. The cultivator can be better guided by swinging the wheels to one side or the other, as desired, than from the handles alone.

Having thus described my improved cultivator, I desire to say that it is capable of considerable variation without departing from my invention. The plow to the side can be used with almost any cultivator, and it can also be used by hitching the lever G rigid to the plow that passes between the hills. The swinging axles can be used on other cultivators without embodying the remaining features of my improved cultivator to very great advantage. Other forms of teeth in the main part of my machine can be used, as little reversible plows, where such are required, or any other form, without departing from my invention.

Having thus described my invention, what I claim as new, and desire to secure by Letters Patent, is—

1. In a wheeled cultivator, the combination, with the frame work of the cultivator, of an arm, E, pivoted thereto; a plow, F, bearing the arm, E', connected to the outer end of the arm, E, which projects outside of one of the wheels of the cultivator; a link, s, with a slot, e, the forward end of said link being pivoted to the arm, E, and connected to the inwardly projecting end of the arm, E', by a bolt in the slot, e; a lever, G, pivoted to the machine and projecting diagonally across toward the side of the machine toward said plow; a link, u', connecting said lever to the arm, E, forming substantially a toggle joint for the purpose of holding the plow out to one side so that it can be operated by the hand by the operative to cultivate between trees or plants in a row, for the purpose specified.

2. In a wheeled cultivator, the combination of the frame work of the cultivator; a supplemental tooth adapted to cultivate between the hills of the row, when the cultivator is passing in the row; an arm connecting said tooth or plow to the cultivator being pivoted at its forward end to the cultivator frame and connected by its rearwardly projecting end to the tooth, and a hand lever for controlling said tooth to swing it out and in to cultivate between the hills of a row, for the purpose specified.

3. In a wheeled cultivator, the combination with the frame work of the cultivator; of wheels on the axis adapted to swing from side to side to guide the cultivator; an arm, E' pivoted thereto; a plow, F, bearing the arm, E', connected to the outer end of the arm, E, which projects outside of one of the wheels of the cultivator; a link, s, with a slot, e, the forward end of said link being pivoted to the arm, E, and connected to the inwardly projecting end of the arm, E', by a bolt in the slot, e; a lever, G, pivoted to the machine and projecting diagonally across toward the side of the machine toward said plow; a link, u', connecting said lever to the arm, E, forming substantially a toggle joint for the purpose of holding the plow out to one side so that it can be operated by the hand by the operative to cultivate between trees or plants in a row, for the purpose specified.

4. In a wheeled cultivator, the combination of the frame work of the cultivator; the wheels on the axis adapted to swing from side to side to guide the cultivator; a supplemental tooth adapted to cultivate between the hills of a row when the cultivator is passing in the row; an arm connecting said tooth or plow to the cultivator being pivoted at its forward end to the cultivator frame and connected by its rearwardly projecting end to the tooth; and a hand lever for controlling said tooth to swing it out and in to cultivate between the hills of a row, for the purpose specified.

5. In a wheeled cultivator, the combination of the frame work of the cultivator; a supplemental tooth adapted to cultivate between the hills of the row when the cultivator is passing in the row; an arm connecting said tooth or plow to the cultivator being pivoted by its forward end to the cultivator frame and connected at the rearwardly projecting end to the tooth; the hand lever for controlling said tooth for moving it in and out to cultivate between the hills of the row; and suitable means of bracing the teeth so that they shall be in a fixed position in relation to the main frame to assist in controlling the tooth when passed between the hills of the row, for the purpose specified.

6. In a wheeled cultivator, the combination of the frame, A; the brackets, L, pivoted to the ends thereof; the axles, P', on said pivoted bracket, L; the wheels, P, on said axles, one of which has the broad, flat teeth, z, on its periphery; the bars, B, parallel to the frame, A, and pivoted to the brackets, L, opposite the pivots on said brackets to the frame, A; a lever, B', pivoted at r, to the frame and at r', to the bar, B, parallel with the pivots at the end of the frame for turning the brackets, L, to vary the angles of the wheels to the direction of the machine; beams, C', extending rearwardly from the pivoted blocks, C, and curving downwardly into suitable standards and bearing cultivator teeth at the rear; an adjustable brace, J, and cross bar, H, connecting the beams of the teeth together for holding them in a fixed position to the frame of the machine; an arm, E, pivoted on one of the blocks, C, by the pivot, f'; the plow, F; the arm, E', extending upwardly and inwardly from said plow and clipped by the clip, E'', to the end of the arm, E; the link, s, with a slot, s', pivoted to the arm, E, and attached by the bolt to the inwardly projecting end of the arm, E', to adjust the angle of the plow; a lever, G, pivoted to the bar, H; the link, u', connecting the lever, G, and arm, E, for actuating the same to allow the plow, F, to be swung out and in by the operator, as specified.

7. In a wheeled cultivator, the combination of the frame, A; the brackets, L, pivoted to the ends thereof; the axles, P', on said pivoted bracket, L; the wheels, P, on said axles, one of which has the broad, flat teeth, z, on its periphery; the bar, B, parallel to the frame, A, and pivoted to the brackets, L, opposite the pivots on said brackets to the frame, A; a lever, B', pivoted at r, to the frame and at r', to the bar, B, parallel with the pivots at the end of the frame for turning the brackets, L, to vary the angles of the wheels to the direction of the machine; beams, C', extending rearwardly from the pivoted blocks, C, and curving downwardly into suitable standards and bearing cultivator teeth at the rear; an adjustable brace, J, and cross bar, H, connecting the beams of the teeth together for holding them in a fixed position to the frame of the machine; a plow; an arm projecting inwardly and forwardly from said plow and pivoted to the frame work of said cultivator; a lever pivoted to the rear of said machine; and suitable connections from said lever to the plow, as specified.

8. In a wheeled cultivator, the combination of a suitable frame; beams extending rearwardly from said frame and bearing teeth to the rear; a bar, H, connecting the beams of the teeth together; and bars, J, connected to the bar, H, and the beams for holding the teeth in a fixed position to the frame of the machine; an arm, E, pivoted on one of the blocks, C, by the pivot, f'; the plow, f; the arm, E', extending upwardly and inwardly from said plow; and clipped by the clip, E'', to the end of the arm, E; the link, s, with a slot, s', pivoted to the arm, E, and attached by the bolt to the inwardly projecting end of the arm, E', to adjust the angle of the plow; a lever, G, pivoted to the bar, H; the link, u', connecting the lever, G, and arm, E, for actuating the same to allow the plow, F, to be swung out and in by the operator, as specified.

9. In a wheeled cultivator, the combination of a suitable frame; wheels for carrying the same; beams pivoted to said frame and projecting rearwardly and downwardly and bearing suitable teeth; upwardly projecting bars, h, toward each side of said frame; levers, D, pivoted to each of said bars, h; a bar, h', bearing a notched segment parallel to each bar, h; parallel bars, a, pivoting each bar, h', and h, together so that they will operate like parallel rulers; a catch on each lever, D, to engage in the notched segment carried by each bar, h'; and suitable connections from said lever mechanism to the teeth below for controlling the elevation of the same, for the purpose specified.

In witness whereof I have hereunto set my hand and seal in the presence of two witnesses.

WILLIAM H. KELLOGG. [L. S.]

Witnesses:
WALTER S. WOOD,
MARIAN I. LONGYEAR.